Aug. 18, 1970  J. W. ADAMS  3,524,279
SYNTHETIC PLANT GROWTH MEDIUM WITH OVERWRAP
Filed Sept. 27, 1967

INVENTOR.
JAMES WILLIAM ADAMS
BY
Frank J. Jordan
ATTORNEY

United States Patent Office 3,524,279
Patented Aug. 18, 1970

3,524,279
SYNTHETIC PLANT GROWTH MEDIUM WITH OVERWRAP
James William Adams, Schofield, Wis., assignor to American Can Company, New York, N.Y., a corporation of New Jersey
Filed Sept. 27, 1967, Ser. No. 670,874
Int. Cl. B65d 75/00; A01g 9/02
U.S. Cl. 47—34.13     1 Claim

ABSTRACT OF THE DISCLOSURE

A self-supporting, shaped body of synthetic plant growth medium capable of sustaining plant growth is provided with an overwrap to retard the rate of water evaporation and thereby provide warmer temperatures around the root zone and prolong the intervals between which watering of the medium is required.

CROSS-REFERENCE

This application incorporates by reference the disclosure in U.S. Pat. 3,467,609, issued Sept. 16, 1969.

BACKGROUND OF THE INVENTION

Traditionally, plants such as geraniums, poinsettias, chrysanthemums, tomatoes, and the like, are started from cuttings or seeds planted in flats, pots, or similar containers filled with soil. More recently, synthetic plant growth media have been used successfully in place of soil for germination and propagation of plants. For example, a known synthetic plant growth medium is disclosed in the aforementioned United States Pat. 3,467,-609. The growth medium therein disclosed comprises polymer-modified cellulous fibers supplemented by fiber-bonding materials and plant nutrients and formed, for example, by known pulp-molding or slushed pulp-molding techniques, into felted mats or blocks of the desired shape. This growth medium is characterized by sterility and resistance to decay and attack by microorganisms, easy penetrability by the plant root structure, lightweight, and by the savings and labor cost attendant on the use of this material in horticulture. The physical characteristics of the aforesaid medium are such that it may be formed into various self-supporting shapes and sizes while still having a sufficiently soft, felted consistency easily penetrable by the plant root structure.

The aforesaid medium is further characterized by its water-retention capabilities in that it is able to absorb and hold several or many (ranging upwards of ten) times its own weight in water. This relatively high water-absorption rate is due to the hydrophilic properties of the fibers and the myriad of interstices between the intermeshed and intertangled fibers. However, considering the nature of the medium, it will be appreciated that a shaped body thereof represents a relatively large surface area which is exposed to the surrounding atmosphere. As a consequence, water in the medium tends to evaporate rapidly, particularly at low relative humidities, thereby lowering its temperature, as a consequence of which plant growth is retarded, and further requiring diligence and frequent watering to avoid drying out. According to the present invention, an overwrap on the shaped medium is effective to retard the rate of water evaporation and ameliorate the aforesaid conditions.

SUMMARY OF THE INVENTION

A self-supporting, shaped body of synthetic plant growth medium, capable of sustaining plant growth and characterized by its capability to absorb many times its own weight in water, is provided with an overwrap of a suitable material to retard the rate of water evaporation from the body, thereby resulting in warmer temperatures within the body around the root structure and prolonging the intervals between which watering of the body is required. The overwrap is provided with means facilitating its removal from the body without damaging the fragile plants growing therein. The overwrap is also effective to maintain medium integrity and to prevent algae from growing on the medium.

DESCRIPTION OF THE PREFERRED EMBODIMENTS

Figure 1:
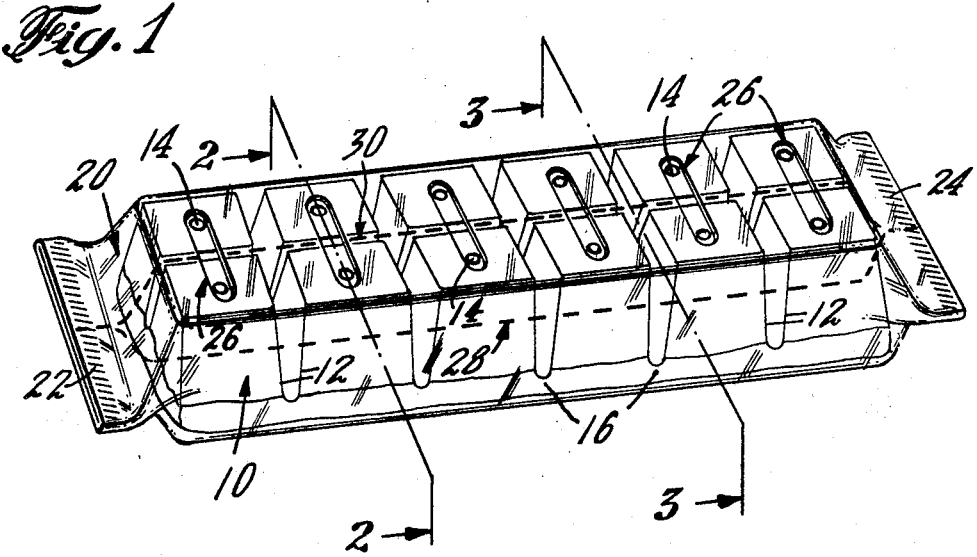
FIG. 1 is a perspective view of a multi-unit cake of synthetic plant growth medium within an overwrap of flexible material.
Figures 2, 3:
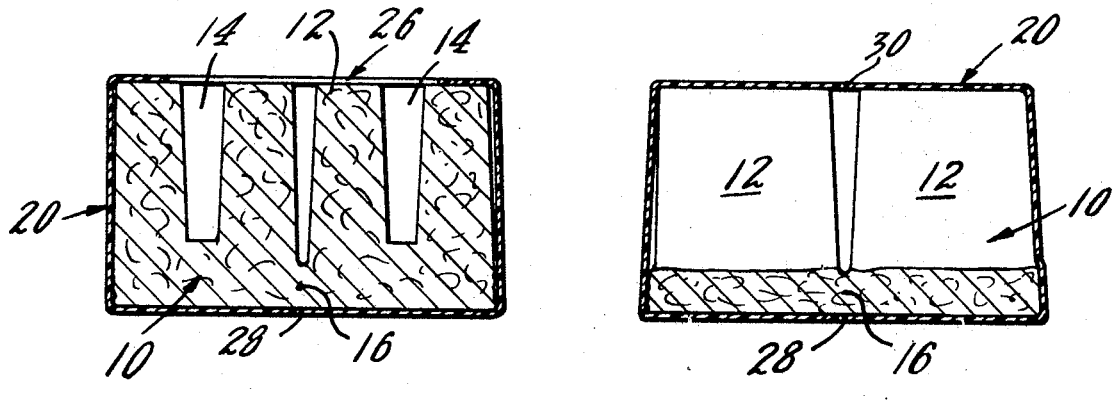
FIG. 2 is a cross-sectional view looking substantially along the line 2—2 of FIG. 1.
FIG. 3 is a cross-sectional view looking substantially along the line 3—3 of FIG. 1.

FIG. 1 shows a multi-unit cake 10 of synthetic growth media consisting of a plurality of planting blocks 12, each having a recess 14 therein for receiving a seed or plant cutting. The blocks 12 are joined together by a readily severable section 16 of reduced thickness to enable the multi-unit cake 10 to be handled in one piece for starting plant growth during the growing period and then later severed into individual plant units or blocks 12 for re-potting or field transplanting.

The planting blocks 12 are made from a synthetic growth medium, for example, polymer-modified wood cellulous fibers of the type disclosed in the aforementioned patent application, and may be formed into the illustrated multi-unit cake 10 by known pulp-molding or slushed-molding techniques. In the forming procedure, the individual fibers become intermeshed and intertangled with one anoher in a "brush-pile" configuration of low-bulk density and having a porous, spongy nature.

The multi-unit cake 10 is covered, at least partially, with an overwrap 20 of a suitable material which serves to retard the rate of water evaporation from the blocks 12. The overwrap 20 may be made from various materials having different physical properties as will be further described. In the illusrated embodiment, the overwrap 20 is in the form of a flexible plastic film extending over all sides of the multi-unit cake 10. The overwrap 20 may be initially formed as a sheath or tube into which the multi-unit cake 10 is inserted and then suitably sealed on either end by heat seals 22 and 24. The overwrap 20 may, of course, be applied over the multi-unit cake 10 in other ways, for example, by inserting the cake 10 into pre-formed bags and thereafter sealing one end, or by wrapping a sheet of overwrap about the cake 10 and suitably sealing it in position along seams as required.

Elongated slots 26, preformed in the overwrap 20, are suitably disposed so that they will align with the recesses 14 in the blocks 12 after the overwrap 20 has been placed in position around the multi-unit cake 10. These slots 26 enable a cutting or seed to be placed in each of the recesses 14 with the overwrap 20 in place and provide growing room for the plants. Alternatively, other forms or openings may be formed in the overwrap including separate openings for each recess 14. Instead of pre-formed openings, premarked indicia may be provided on the overwrap 20 to align with the recesses 14 when the overwrap 20 is in place, the openings being formed by cutting or punching out the overwrap at the indicia whenever desired before use. For example, before the cake 10 is wrapped, seeds may be inserted into the recess 14 and suitably covered, for example, by a water-dispersable caulking material (e.g., sand bound with polyvinyl alcohol resin) or by a wad or plug of the growth medium. A grower need only cut or punch out holes in the overwrap 20, as indicated by the premarked indicia, over the recesses 14 and apply water to start germination.

In order to facilitate watering of the blocks 12, suitable openings may be provided in the bottom of the overwrap 20 so that when the wrapped cake 10 is disposed in a shallow pan or the like, water in the pan will pass through such bottom openings and be absorbed by the blocks 12. The bottom openings may be in the form of perforations or spaced slits 28 extending longitudinally and centrally of the cake 10 so that such perforations or slits 28 will also serve as a readily severable parting or tear line to facilitate removal of the overwrap 20 from the cake 10, as will be described. Since the multi-unit cake 10 is adapted to rest on a flat surface, its underside is not directly exposed to the atmosphere. Accordingly, the bottom of the overwrap 20 may have large openings or it may be substantially unwrapped without appreciably affecting the overall rate of water evaporation from the blocks 12. Also, where faster evaporation rates are to be tolerated, the top of the overwrap 20 may have larger openings which would facilitate watering from the top, if desired.

After the plants in the growth medium have rooted and are ready to be transplanted to a field or elsewhere, it is necessary to remove the overwrap 20 to permit free growth of the root structure beyond the boundaries of the blocks 12. To facilitate its removal, suitable perforations, slits, score lines, pull tapes, or the like, may be strategically located on the overwrap. Thus, the upper portion of the overwrap 20 may have a line of spaced slits 30 running longitudinally down the middle thereof. It will be apparent that the slits 30, and the previously described slits 28, will permit the overwrap 20 to be readily separated down the middle, by manual manipulation, into two halves without damaging the fragile plants or impairing the integrity of the individual blocks 12 of growth medium.

As previously indicated, water in the aforesaid medium tends to evaporate rapidly to produce a cooling effect which tends to lower the temperature of the block in the root zone and thereby retard plant growth, and further requiring diligence and frequent watering to avoid drying out. Application of an overwrap to the medium alleviates the aforesaid condition in that the overwrap is effective to retard the rate of evaporation and to provide a warmer internal block temperature. To illustrate this by way of a specific example, glass thermometers were inserted in one-inch-deep holes in three 1½ x 1½ x 2-inch-tall blocks of growth medium. One block was uncovered, the four sides of the second block were covered with polyethylene film, and the four sides plus the top were covered with polyethylene film on the third block. All three blocks were saturated wtih water and, when they were equilibrated in a room at 25° C. and 35% relative humidity, temperatures near the block centers were 20, 22.7 and 23.2° C. in the respective order described. Thus, the overwrap was effective to increase the block temperature 3.2° C.

In another specific example, a saturated 1½-inch cube of growth medium, when placed under ordinary room conditions of 25° C. and 35% relative humidity, lost all its water in four days. Covering four sides with polyethylene film increased the time to dry to seven days. When the four sides and the top were covered, it took fourteen days for the block to dry out.

The multi-unit cake shown in FIG. 1 may be formed by known pulp-molding or slushed-molding techniques. Since pulp-molding processes lend themselves to the preparation of a wide variety of shapes, it will be appreciated that the growth medium may be formed into multi-sided cubes, truncated cones or pyramids, cylinders, cakes having any number of severable bodies, or other desirable shapes which may have special adaptability to a given application. Blocks may also be molded to fit within standard containers or special-shaped vessels or cartons in which plants are sold to the consumer. In each case, the overwrap would be adapted substantially to the particular shape of the body.

The overwrap may consist of clear film of polyolefin (e.g., polyethylene or polypropylene) or an opaque or suitably cooled film having limited or substantially no light-transmission properties or other physical characteristics effective as a barrier to retard the evaporation rate from the growth media. Foil (e.g., aluminum) and the like may also be employed. Various combinations of perforations, score lines, slits, or easy-open features may be provided on the overwrap to facilitate its removal without damaging the fragile plants.

The overwrap may also consist of a stiff material (e.g., foam plastic) which can be originally made flat and folded like a carton around the shaped medium with suitable openings at the top for the plants. Suitable locking devices may be provided, as desired, to maintain closure of the carton on the medium. It will be appreciated that different overwrap materials will have varying characteristics as to imperviousness. Accordingly, as may be deemed suitable, perforations, slits, or other openings may be suitably located on the overwrap to facilitate exposure to the proper growing conditions.

It will be appreciated that the overwrap also serves to securely bind the blocks together and thereby facilitate maintenance of their integrity during handling. The overwrap also tends to prevent algae from growing on the medium.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:
1. A plant growth medium in the form of a felted mat of predetermined shape and dimensions comprising fibers consisting essentially of natural cellulose having chemically bonded therein and thereon by in situ polymerization between about 50 and 100 parts by weight of a polymer of or olefinically unsaturated monomer for each 100 parts of said cellulose fibers, said mat being in the form of a multi-unit body comprising a plurality of blocks free of and spaced from each other at one end and joined to one another at their other end, each of said blocks having a recess therein extending longitudinally from the free end toward the connected end to receive a plant element to be grown in said medium, and an opaque, substantially water impermeable overwrap substantially enclosing said multi-unit body, said overwrap having indicia means aligned with said recesses in said blocks when the overwrap is in place on the body to facilitate making openings in the overwrap in alignment with said recesses, said overwrap retarding the rate of water evaporation from the body, thereby providing warmer temperatures within the body and prolonging the intervals between which watering is normally required.

References Cited

UNITED STATES PATENTS

| | | | |
|---|---|---|---|
| 1,486,431 | 3/1924 | Harvey | 47—37 |
| 2,416,136 | 2/1947 | Arlington | 47—41 |
| 2,829,468 | 4/1958 | Wingerden et al. | 47—37 XR |
| 2,988,441 | 6/1961 | Pruitt. | |
| 3,172,234 | 3/1965 | Eavis | 47—1.2 |
| 3,362,106 | 1/1968 | Goldring | 47—56 |

ROBERT E. BAGWILL, Primary Examiner

U.S. Cl. X.R.

47—37